United States Patent
Kaidu et al.

(10) Patent No.: US 9,748,879 B2
(45) Date of Patent: Aug. 29, 2017

(54) MOTOR DRIVE CONTROLLER AND CONTROL METHOD OF MOTOR DRIVE CONTROLLER

(71) Applicant: MINEBEA CO., LTD., Kitasaku-Gun, Nagano (JP)

(72) Inventors: Hiroyuki Kaidu, Iwata (JP); Masato Aoki, Iwata (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 14/939,515

(22) Filed: Nov. 12, 2015

(65) Prior Publication Data

US 2016/0149526 A1    May 26, 2016

(30) Foreign Application Priority Data

Nov. 20, 2014    (JP) .................... 2014-235940

(51) Int. Cl.
*H02P 6/06* (2006.01)
*H02P 6/34* (2016.01)
*H02P 6/17* (2016.01)

(52) U.S. Cl.
CPC .............. *H02P 6/34* (2016.02); *H02P 6/06* (2013.01); *H02P 6/17* (2016.02)

(58) Field of Classification Search
CPC .............. H02K 1/27; H02P 6/06; H02P 6/17
See application file for complete search history.

(56) References Cited

U.S. PATENT DOCUMENTS

| 5,446,360 | A * | 8/1995 | Son | G05B 13/042 318/560 |
| 6,091,216 | A * | 7/2000 | Takahashi | H02P 6/085 318/400.09 |
| 6,611,117 | B1 * | 8/2003 | Hardt | H02P 6/12 318/400.1 |
| 6,727,668 | B1 * | 4/2004 | Maslov | H02P 23/0004 310/254.1 |
| 2005/0099153 | A1 * | 5/2005 | Komatsu | H02P 6/15 318/807 |
| 2008/0211450 | A1 * | 9/2008 | Yamada | H02P 23/0027 318/801 |
| 2009/0251085 | A1 * | 10/2009 | Pierre | H02H 7/093 318/400.21 |
| 2012/0206078 | A1 * | 8/2012 | Norell | H02K 19/103 318/400.42 |
| 2012/0274316 | A1 * | 11/2012 | Matsuura | G01D 5/2046 324/207.17 |

FOREIGN PATENT DOCUMENTS

JP    2004-072903 A    3/2004

* cited by examiner

*Primary Examiner* — Shawki S Ismail
*Assistant Examiner* — Muhammad S Islam
(74) *Attorney, Agent, or Firm* — Carrier Blackman & Associates, P.C.; Joseph P. Carrier; Jeffrey T. Gedeon (57) ABSTRACT

A motor drive controller is provided with: a motor drive circuit that drives a motor and having a position detector that detects a position of a rotor of the motor and outputs a position detection signal; a motor control circuit that generates a rotation pulse signal based on the position detection signal output by the motor drive circuit; and a microcomputer that is provided with at least one timer and outputs a conversion signal that is obtained by multiplying the rotation pulse signal by n, where n is a natural number equal to or greater than two.

6 Claims, 6 Drawing Sheets

MOTOR DRIVE CONTROLLER AND CONTROL METHOD OF MOTOR DRIVE CONTROLLER

BACKGROUND OF THE INVENTION

1. Field of the Invention

The present invention relates to a motor drive controller and a control method of motor drive controller.

2. Description of the Related Art

Recently, since a brushless motor has a long life span and is maintenance-free, the brushless motor has been widely used. In stationary equipment, since there is a margin in an installment space, a brushless motor and a control circuit are often separately configured. However, in portable equipment, since the margin in an installment space is small, a brushless motor and a control circuit are often configured as a unified body. The control circuit in the related art is specially configured to drive a specific type of brushless motor.

By improving a degree of freedom in selecting a type of a brushless motor, it is possible to decrease a procurement cost and to improve performance. Accordingly, the control circuit is preferred to have a capability to drive an arbitrary type of brushless motor as well as a specific type of brushless motor.

In JP-A-2004-072903, it is described that "An object is to provide a brushless motor which has low noise and low vibration and is easily replaceable without changing a rotation speed detection circuit that is provided in equipment to which the brushless motor is installed, by outputting a rotation speed signal of the same number of pulses as a motor with eight rotor poles even when the number of rotor poles is ten," and the means of solving thereof describes that "A rotation speed pulse signal of four pulses or twelve pulses per rotation can be output even when the number of rotor poles is ten, by installing a rotation speed pulse signal frequency converting circuit 17." Accordingly, brushless motors having different numbers of rotor poles can be commonly used in the same equipment (system).

In paragraph [0027] of JP-A-2004-072903, it is described that "The output signals 15ao to 15co of the position detecting elements 15a to 15c are signals of five pulses per rotation in which electrical angles are different by 120 degrees. The position detection signal processing circuit 16 processes the output signals 15ao to 15co and outputs a signal 15ao of five pulses per rotation or a signal 15bo of fifteen pulses per rotation. The rotation speed pulse signal frequency converting circuit 17 frequency-converts the signal 15ao or the signal 15bo and outputs a signal 17ao of four pulses per rotation or a signal 17bo of twelve pulses per rotation. The signal 17ao or the signal 17bo is output to the outside through the rotation speed pulse signal output circuit 18." That is, the frequency of the rotation speed pulse signal is converted by the rotation speed pulse signal frequency converting circuit.

However, the technique described in JP-A-2004-072903 is based on the premise that a motor outputs plural rotation speed pulse signals (hereinafter, referred to as "rotation pulse signal") in which electrical angles thereof are different by a predetermined angle. Accordingly, the technique cannot be applied to a system based on the premise that a motor outputs a single rotation pulse signal. Specifically, the technique described in JP-A-2004-072903 may not be applied when a motor outputting two pulses per rotation is used in a system based on the premise that a motor outputs a single rotation pulse signal and four pulses per rotation. That is, when a single rotation pulse signal is used, the single rotation pulse signal cannot be converted in frequency and thus there is a problem in that the motor itself should be changed or the frequency should be multiplied by two by a microcomputer.

A rotation pulse signal FG slowly increases in frequency until a motor reaches a target rotation speed after the motor is started, and decreases in period in inverse proportion thereto. When it is intended to measure the period of the rotation pulse signal FG using a microcomputer, a scaler of a timer should be scanned to cope with the change in frequency, the processing is complicated, and thus a high-speed microcomputer is required. When it is intended to output a signal obtained by multiplying the measured period, a timer other than the timer used to measure the period of the rotation pulse signal FG is required and thus a high-performance microcomputer having two or more timers is required. Accordingly, there is a problem in that the system cost is high.

SUMMARY OF THE INVENTION

One of objects of the present invention is to provide a motor drive controller and a control method of motor drive controller that can multiply a rotation pulse signal by n (where n is a natural number of two or greater) using a low-cost microcomputer.

According to an illustrative embodiment of the present invention, there is provided a motor drive controller including: a motor drive circuit that drives a motor and having a position detector that detects a position of a rotor of the motor and outputs a position detection signal; a motor control circuit that generates a rotation pulse signal based on the position detection signal output by the motor drive circuit; and a microcomputer that is provided with at least one timer and outputs a conversion signal that is obtained by multiplying the rotation pulse signal by n, where n is a natural number equal to or greater than two.

According to another illustrative embodiment of the present invention, there is provided a motor drive controller including: a motor drive circuit that drives a motor and having a position detector that detects a position of a rotor of the motor and outputs a position detection signal; a motor control circuit that generates a rotation pulse signal based on the position detection signal; and a microcomputer that is provided with at least one timer and generates a conversion signal by multiplying the rotation pulse signal by n, where n is a natural number equal to or greater than two, wherein the microcomputer does not output the conversion signal when a rotation speed of the motor is slower than a predetermined speed and outputs the conversion signal when the rotation speed of the motor is equal to or faster than the predetermined speed.

According to still another illustrative embodiment of the present invention, there is provided a control method of motor drive controller including: driving a motor; detecting a position of a rotor of the motor to output a position detection signal; generating a rotation pulse signal based on the position detection signal; generating a conversion signal by multiplying the rotation pulse signal by n, where n is a natural number equal to or greater than two; determining a rotation speed of the motor based on the position detection signal; omitting to output the conversion signal when the rotation speed is slower than a predetermined speed; and outputting the conversion signal when the rotation speed is equal to or faster than the predetermined speed.

DETAILED DESCRIPTION

Hereinafter, embodiments of the present invention will be described in detail with reference to the accompanying drawings.

Figure 1:
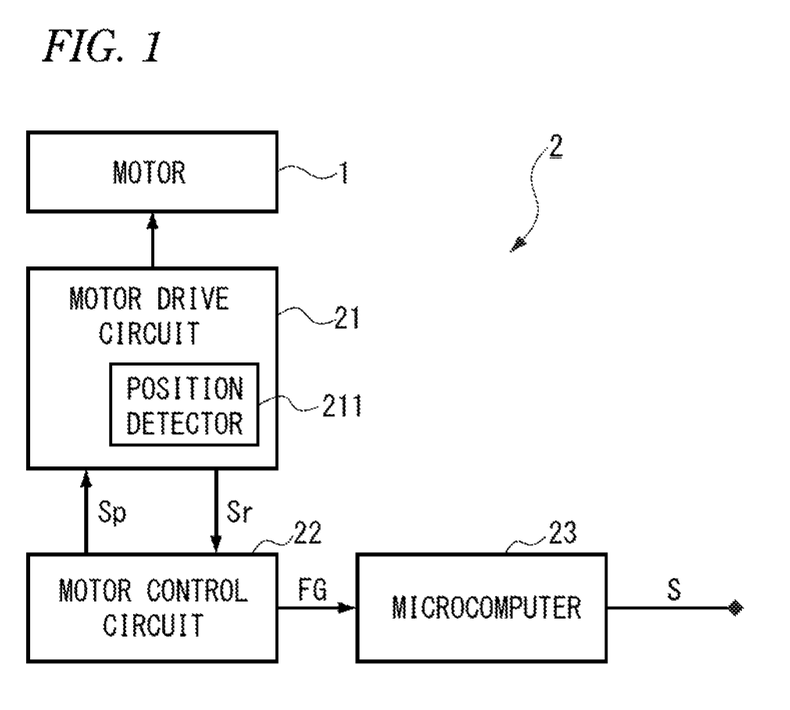
FIG. 1 is a diagram schematically illustrating a configuration of a motor drive controller according to an embodiment.

FIG. 1 is a diagram schematically illustrating a configuration of a motor controller 2 of a motor 1 according to an embodiment.

As illustrated in FIG. 1, the motor controller 2 of the motor 1 includes a motor drive circuit 21, a motor control circuit 22, and a microcomputer 23. The motor 1 operates to output a rotation pulse signal of two pulses per rotation. The motor controller 2 controls the driving of the motor 1 in accordance with an instruction from a system (not illustrated).

The motor drive circuit 21 includes a position detector 211 such as a Hall sensor. When a motor drive signal Sp is input, the motor drive circuit 21 rotationally drives the motor 1 by supplying a current to the motor 1, detects the position of a rotor using the position detector 211, and outputs a position detection signal Sr. The position detector 211 is not limited to the Hall sensor, but may employ an arbitrary system.

The motor control circuit 22 outputs the motor drive signal Sp to the motor drive circuit 21 and outputs a rotation pulse signal FG from the position detection signal Sr of the rotor. In the rotation pulse signal FG, two pulses appear for each rotation of the motor 1.

The microcomputer 23 multiplies the rotation pulse signal FG and outputs a conversion signal S to a system (not illustrated). In the conversion signal S, four pulses appear for each rotation of the motor 1. By outputting the conversion signal S, for example, a motor outputting two pulses per rotation can be used for a system based on the premise that a motor outputs a single rotation pulse signal and four pulses per rotation.

Figure 2:
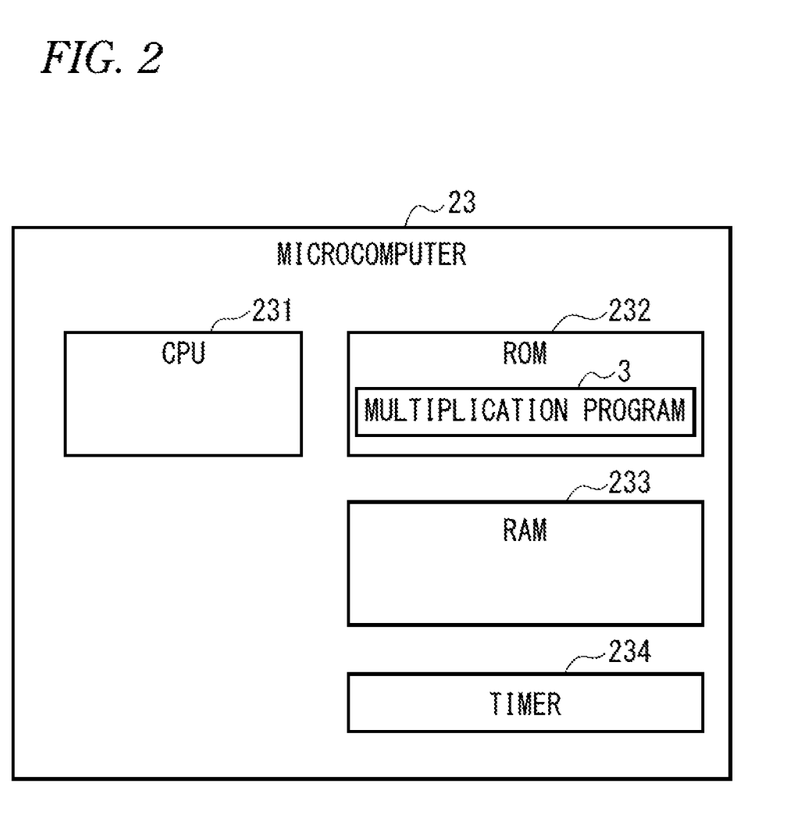
FIG. 2 is a diagram schematically illustrating a configuration of a microcomputer according to the embodiment.

FIG. 2 is a diagram schematically illustrating the configuration of the microcomputer 23 according to this embodiment.

As illustrated in FIG. 2, the microcomputer 23 includes a central processing unit (CPU) 231, a read only memory (ROM) 232, a random access memory (RAM) 233, and a timer 234. The microcomputer 23 includes the single timer 234 and outputs the conversion signal S which is obtained by multiplying the rotation pulse signal FG by two using the timer 234.

The CPU 231 is a central processing unit and generates the conversion signal S, which is obtained by multiplying the rotation pulse signal FG, by executing a program stored in the ROM 232 or the RAM 233.

The ROM 232 is a memory from which stored information can be merely read and stores, for example, a multiplication program 3. The multiplication program 3 is executed by the CPU 231 to embody a multiplication unit (not illustrated in the accompanying drawings).

The RAM 233 is a memory in which stored data can be accessed in an arbitrary order and stores, for example, variables of a program in processing.

The timer 234 is, for example, a 8-bit register and measures an elapsed time. The CPU 231 measures time using the timer 234. The CPU 231 sets the unit of counted time using a scaler of the timer 234, sets a value corresponding to a predetermined time in the timer 234, and then starts measurement. The timer 234 increases the value with the lapse of time and generates an overflow interrupt when the value is changed 255 to 0. Accordingly, the timer 234 can notify the CPU 231 of the lapse of the predetermined time. The timer 234 may not have a function of capturing the timing of an external trigger. The timer 234 is not limited to an increment operation, but may measure the lapse of time through a decrement operation.

Figure 3:
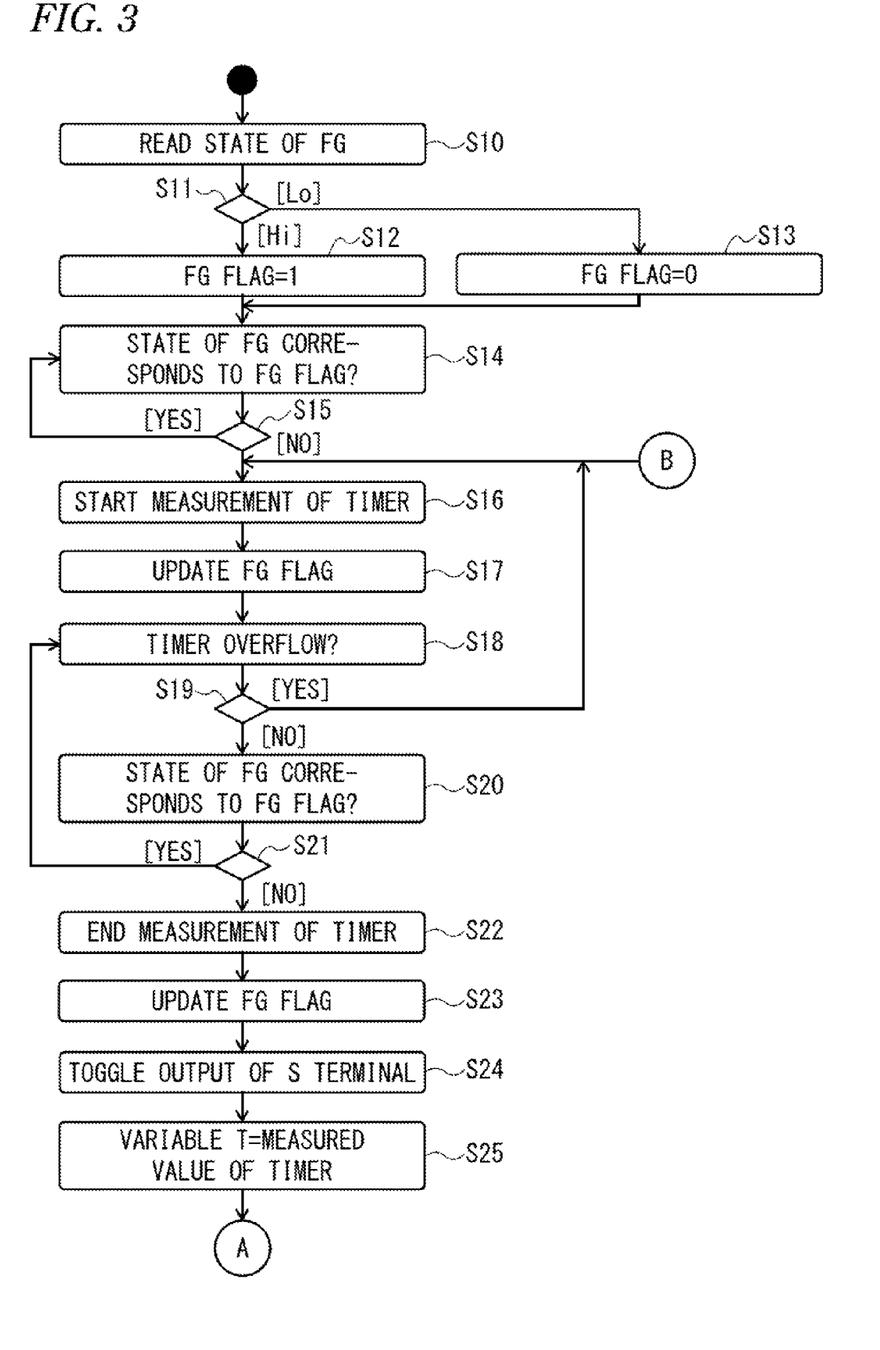
FIG. 3 is a diagram illustrating activity of a (first) multiplication process which is performed by the microcomputer.

FIG. 3 is an activity diagram of a (first) two-multiplication process by the microcomputer 23.

When the microcomputer 23 is activated by the system or the like, the microcomputer 23 performs a multiplication process subsequent to step S10. At this time, the conversion signal S output from an S terminal of the microcomputer 23 is initialized to Low.

In step S10, the microcomputer 23 reads the state of the rotation pulse signal FG.

In step S11, the microcomputer 23 determines which of High and Low the state of the rotation pulse signal FG is. The microcomputer 23 performs the process of step S12 when the state of the rotation pulse signal FG is High, and performs the process of step S13 when the state of the rotation pulse signal FG is Low. In FIG. 3, High is abbreviated to "Hi" and Low is abbreviated to "Lo."

In step S12, the microcomputer 23 sets an FG flag to 1 and then performs the process of step S14. Here, the FG flag is a variable stored in the RAM 233.

In step S13, the microcomputer 23 sets the FG flag to 0 and then performs the process of step S14.

In step S14, the microcomputer 23 newly reads the state of the rotation pulse signal FG and determines whether the state of the rotation pulse signal FG corresponds to the FG flag.

In step S15, the microcomputer 23 performs the process of step S14 again when the state of the rotation pulse signal FG corresponds to the FG flag (YES), and performs the process of step S16 when the state of the rotation pulse signal FG does not correspond to the FG flag (NO). Accordingly, the edge timing of the rotation pulse signal FG can be detected.

In step S16, the microcomputer 23 starts time measurement using the timer 234. At this time, the microcomputer 23 can set to a minimum value (for example, 0) for the timer 234.

In step S17, the microcomputer 23 updates the FG flag using the rotation pulse signal FG. Specifically, the microcomputer 23 performs the same processes as steps S10 to S13 and reflects the newest state of the rotation pulse signal FG in the FG flag. This is performed to detect a next edge of the rotation pulse signal FG.

In step S18, the microcomputer 23 determines whether an overflow of the timer 234 occurs.

In step S19, the microcomputer 23 performs the process of step S16 again when an overflow of the timer 234 occurs (YES), and performs the process of step S20 when an overflow of the timer 234 does not occur (NO). Accordingly, the microcomputer 23 can perform control of not outputting the conversion signal S, which is obtained by multiplying the rotation pulse signal FG by n, until the motor 1 reaches a predetermined rotation speed. Here, the predetermined rotation speed refers to a speed at which an edge period of the rotation pulse signal FG is small enough not to cause the overflow of the timer 234. The edge period of the rotation pulse signal FG refers to a period from the timing at which an edge of the rotation pulse signal FG is detected to the timing at which a next edge is detected.

In step S20, the microcomputer 23 determines whether the state of the rotation pulse signal FG corresponds to the FG flag.

In step S21, the microcomputer 23 performs the process of step S18 again, because a next edge of the rotation pulse signal FG is not detected, when the state of the rotation pulse signal FG corresponds to the FG flag (YES) and performs the process of step S22, because a next edge of the rotation pulse signal FG is detected, when the state of the rotation pulse signal FG does not correspond to the FG flag (NO). Accordingly, the microcomputer 23 can detect the edge of the rotation pulse signal FG.

In step S22, the microcomputer 23 ends the time measurement using the timer 234. At this time, the timer 234 stores a time from the timing at which the timer is set in step S16 to the timing at which the time measurement is ended. The time is an approximate value of the time from the timing at which an edge of the rotation pulse signal FG is detected in step S15 to the timing at which a next edge of the rotation pulse signal FG is detected in step S21.

In step S23, the microcomputer 23 updates the FG flag using the rotation pulse signal FG. This process is the same as steps S10 to S13.

In step S24, the microcomputer 23 toggles the output of the S terminal (i.e. toggles the conversion signal S) and inverts the logic of the conversion signal S. In this description, "toggle" the output of the S terminal or the conversion signal S is used in a meaning to "invert the pulse waveform of the conversion signal S."

Figure 4:
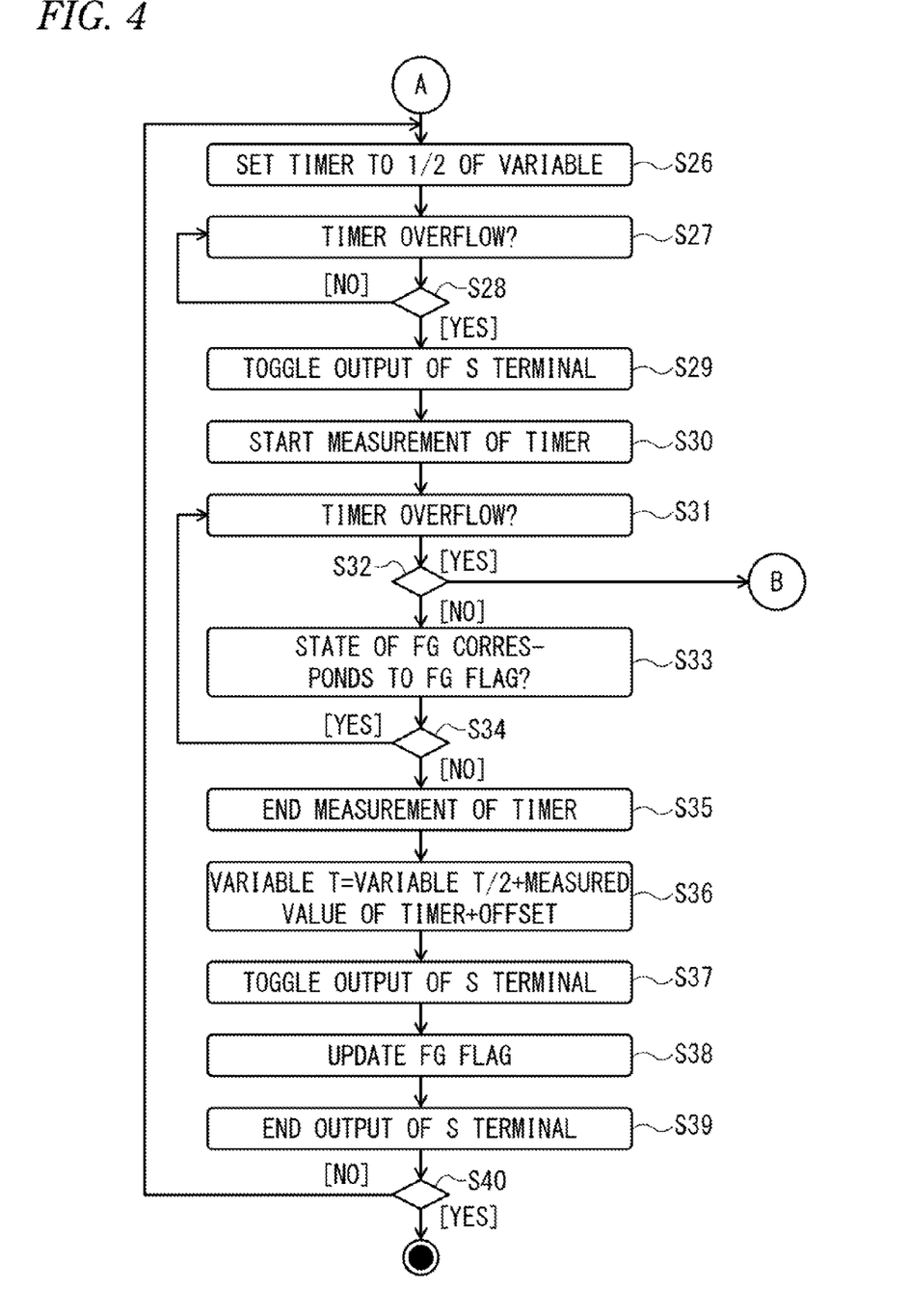
FIG. 4 is a diagram illustrating activity of a (second) multiplication process which is performed by the microcomputer.

In step S25, the microcomputer 23 sets a variable T to the measured value of the timer 234 and performs the process of step S26 illustrated in FIG. 4 via node A. The measured value of the timer 234 can be calculated by subtracting the value (for example, 0) at the time of start of measurement from the value at the time of end of measurement of the timer 234.

FIG. 4 is an activity diagram of a (second) two-multiplication process by the microcomputer 23.

In step S26, the microcomputer 23 sets ½ of the variable T for the timer 234. That is, a value which is obtained by subtracting ½ of the variable T from the maximum count 256 of the timer 234 and starts the time measurement using the timer 234. Accordingly, the timer 234 can generate an overflow at ½ of the edge interval of the previous rotation pulse signal FG for notification to the microcomputer 23. ½ of the variable T can be calculated in a practical operation time using a low-cost microcomputer by a shift operation, with reference to a table, or the like.

Specifically, when the scaler of the timer is set to 100 microseconds and the timer simply counts up, an overflow occurs every 25.6 milliseconds. Here, when the variable T set in step S25 is 10.0 milliseconds, "256−(100/2)=206" is set for the timer 234 in step S26.

In step S27, the microcomputer 23 determines whether an overflow of the timer 234 occurs.

In step S28, the microcomputer 23 performs the process of step S27 again when an overflow of the timer 234 does not occur (NO), and performs the process of step S29 when an overflow of the timer 234 occurs (YES).

In step S29, the microcomputer 23 toggles the output of the S terminal and inverts the logic of the conversion signal S.

In step S30, the microcomputer 23 starts the time measurement using the timer 234. At this time, the microcomputer 23 can set the timer 234 to a minimum value (for example, 0).

In step S31, the microcomputer 23 determines whether an overflow of the timer 234 occurs.

In step S32, the microcomputer 23 performs the process of step S16 (see FIG. 3) again via node B when an overflow of the timer 234 occurs (YES), and performs the process of step S33 when an overflow of the timer 234 does not occur (NO).

In step S33, the microcomputer 23 determines whether the state of the rotation pulse signal FG corresponds to the FG flag.

In step S34, the microcomputer 23 performs the process of step S31 again when the state of the rotation pulse signal FG corresponds to the FG flag (YES), and performs the process of step S35 when the state of the rotation pulse signal FG does not correspond to the FG flag (NO). Accordingly, the microcomputer 23 can detect the edge of the rotation pulse signal FG.

In step S35, the microcomputer 23 ends the time measurement using the timer 234.

In step S36, the microcomputer 23 sets the variable T to a value which is obtained by adding a measured value and an offset of the timer 234 to ½ of the variable T. The measured value of the timer 234 can be calculated by subtracting the value at the time of start of measurement from the value at the time of end of measurement of the timer 234. The offset is the total sum of the process times of steps S28, S29, and the like which are not measured by the timer 234. The offset may be experimentally calculated by inputting a pulse signal of an existing period to the microcomputer 23.

In step S37, the microcomputer 23 toggles the output of the S terminal and inverts the logic of the conversion signal S.

In step S38, the microcomputer 23 updates the FG flag using the rotation pulse signal FG. This process is the same as steps S10 to S13.

In step S39, the microcomputer 23 determines whether the output of the S terminal is ended.

In step S40, the microcomputer 23 performs the process of step S26 again when the output of the S terminal is not ended (NO), and ends the process flow of FIG. 4 when the output of the S terminal is ended (YES).

As a result, the microcomputer 23 can measure the edge interval of the rotation pulse signal FG using the timer 234 and can determine the timing at which the output of the S terminal is toggled to invert the logic of the conversion signal S.

When the rotation pulse signal FG is multiplied by three, the microcomputer 23 can apply ⅓ of the variable T instead of ½ of the variable T in steps S26 and S36 and can repeat the processes of steps S26 to S29 two times.

The conversion signal S is generated using the following method.

The conversion signal S is at low in a first period of the rotation pulse signal FG.

Thereafter, the conversion signal S is inverted at the same time as inverting the logic of the rotation pulse signal FG.

The conversion signal S is inverted in the logic after the time obtained by multiplying the time measurement result in the High section or the Low section of the rotation pulse signal FG immediately before the logic is inverted by 1/n elapses. This operation is repeated (n−1) times. Here, n is a natural number equal to or greater than two indicating the multiplication number.

Figure 5:
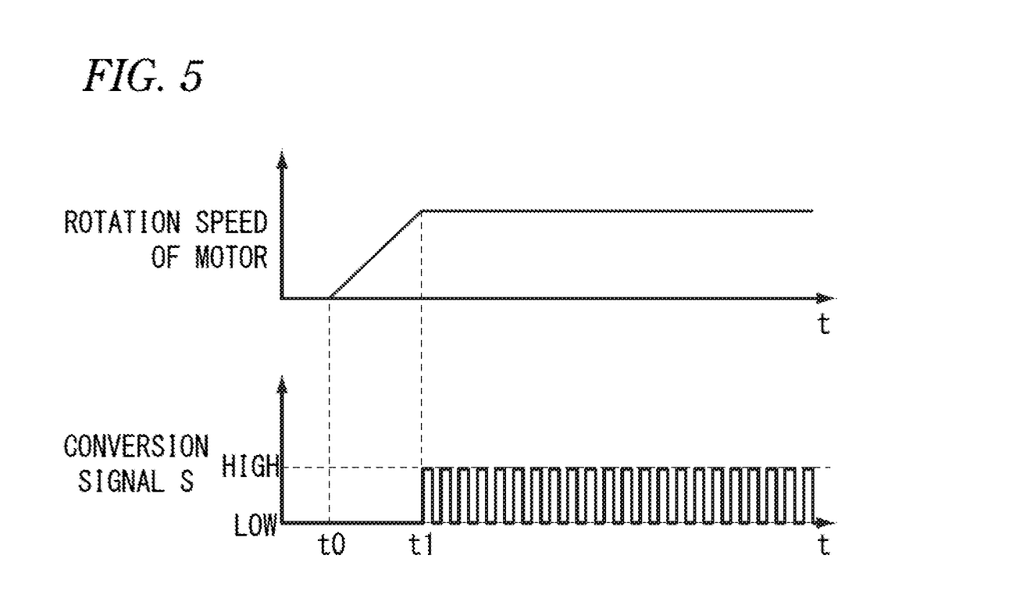
FIG. 5 is a graph illustrating a relationship between a rotation speed of a motor and a conversion signal waveform.

FIG. 5 is a graph illustrating a relationship between the rotation speed of the motor 1 and the waveform of the conversion signal S.

From time t0 at which the motor 1 is started to time t1 at which the motor 1 reaches a predetermined rotation speed, the conversion signal S is maintained at Low. The system drives the motor with a predetermined torque and does not perform feedback control based on the conversion signal S until the motor 1 reaches the predetermined rotation speed, this simplified operation does not cause any problem. Since the conversion signal S can be output only in a state in which the rotation speed reaches a predetermined value, the microcomputer 23 can multiply the rotation pulse signal FG without resetting the scaler of the timer 234.

After time t1, the conversion signal S is repeatedly switched between Low and High to multiply the rotation pulse signal FG by two. For example, the system feeds back a difference between a period of the conversion signal S and a target period and controls the rotation speed, after the motor 1 reaches the predetermined rotation speed. The period of the rotation pulse signal FG after the motor 1 reaches the predetermined rotation speed can be acquired even by the eight-bit timer 234 of which the scaler is fixed. Accordingly, the rotation pulse signal FG can be multiplied by a low-cost microcomputer 23.

Figure 6:
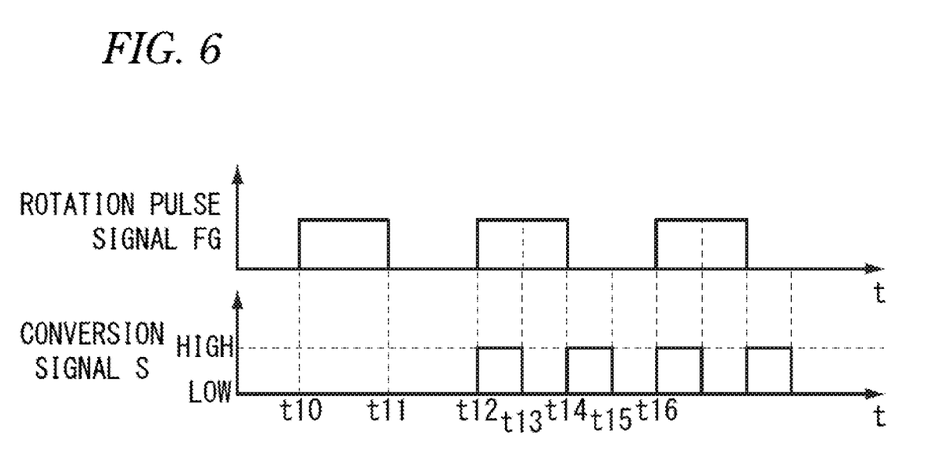
FIG. 6 is a waveform diagram illustrating a rotation pulse signal of a motor and a conversion signal.

FIG. 6 is a waveform diagram illustrating the rotation pulse signal FG of the motor 1 and the conversion signal S.

The waveform diagram illustrated in FIG. 6 illustrates an example in which the rotation pulse signal FG is multiplied by the conversion signal S of twice frequency.

When the input of the rotation pulse signal FG is started at time t10, the time to time t12 is a first period of the rotation pulse signal FG and thus the conversion signal S is maintained at Low. This corresponds to transition from step S10 to step S19.

At time t12, the logic of the conversion signal S is inverted at the same time as inverting the logic of the rotation pulse signal FG. This corresponds to the operation of step S24.

At time t13, since the ½ time from time t11 to time t12 elapses from time t12, the logic of the conversion signal S is inverted. This operation is repeated (n−1) times in case of multiplication by n. Since the multiplication number is two in this embodiment, the operation is performed once. This corresponds to the operation of step S29.

At time t14, the logic of the conversion signal S is inverted at the same time as inverting the logic of the rotation pulse signal FG. This corresponds to the operation of step S37.

At time t15, since the ½ time from time t12 to time t14 elapses from time t14, the logic of the conversion signal S is inverted. This corresponds to the operation of step S29.

At time t16, the logic of the conversion signal S is inverted at the same time as inverting the logic of the rotation pulse signal FG. This corresponds to the operation of step S37.

Thereafter, the waveform between times t12 and time t16 is repeated. Accordingly, the rotation pulse signal FG is multiplied to generate the conversion signal S.

In the present invention, the motor controller 2 of the motor 1 performs the control of multiplying the rotation pulse signal FG input from the motor control circuit 22 by n (multiplies the frequency by n), outputting the multiplied signal to the system, and not outputting the rotation pulse signal FG from the timing at which the motor 1 is started to the timing at which the motor 1 reaches a predetermined rotation speed.

According to the present invention, since the rotation pulse signal FG can be multiplied by a low-cost microcomputer 23 having a single timer 234, it is possible to freely select a motor 1 which can be used in the system. Since a high-speed process is unnecessary, it is possible to use a low-cost microcomputer 23 and to construct a system at a low cost.

Modification Examples

The present invention is not limited to the above-mentioned embodiment, but can be modified without departing from the gist of the present invention. For example, the following modification examples (a) to (e) can be considered.

(a) The conversion signal S is not limited to multiplication of the rotation pulse signal FG by two, but may be a multiple of the rotation pulse signal FG by n which is a natural number equal to or greater than two.

(b) Immediately before step S16 of FIG. 3, the microcomputer 23 may initialize the output signal of the S terminal to Low. Accordingly, when the timer 234 times out, the conversion signal S output from the S terminal is initialized to Low. The system can easily detect abnormality of the motor 1 by detecting that the conversion signal S is at Low for a predetermined time or more.

(c) In step S31 of FIG. 4, the microcomputer 23 detects the time-out by the overflow of the timer 234 and thus detects the lapse of a predetermined time. However, the present invention is not limited to this configuration, but the microcomputer 23 may detect the lapse of a predetermined time by reading the timer 234 and comparing the read value with a predetermined value.

(d) The microcomputer 23 may include plural timers and can perform the motor drive control process (multiplication process) of the present invention using only one timer thereof, but the present invention is not particularly limited to this configuration.

(e) An application specific integrated circuit (ASIC) or a field-programmable gate array (FPGA) may be used instead of the microcomputer 23. In this case, the same advantages as described above are obtained.

What is claimed is:

1. A motor drive controller comprising:
   a motor drive circuit that drives a selected motor and having a position detector that detects a position of a rotor of the selected motor and outputs a position detection signal;
   a motor control circuit that generates a rotation pulse signal based on the position detection signal output by the motor drive circuit; and a microcomputer that is provided with at least one timer and is configured to:
  generate a conversion signal, which is an expected rotation pulse signal for an expected motor, by multiplying a frequency of the rotation pulse signal by n; and
  output the conversion signal to an external system, where n is a natural number equal to or greater than two,
wherein the external system controls an operation of the selected motor in place of the expected motor by using the conversion signal,
wherein the microcomputer measures an edge interval of the rotation pulse signal using the timer and determines a time to toggle the conversion signal,
wherein the microcomputer obtains a value by dividing the nearest edge interval measured by the timer by n, sets the timer to the value, and toggles the conversion signal when the timer times out, and
wherein when the conversion signal is toggled (n−1) times, the microcomputer measures a period to a next edge of the rotation pulse signal using the timer to measure the nearest edge interval.

2. The motor drive controller according to claim 1,
wherein the microcomputer does not output the conversion signal until the selected motor reaches a predetermined rotation speed and outputs the conversion signal when the selected motor reaches the predetermined rotation speed.

3. The motor drive controller according to claim 1,
wherein the microcomputer toggles the conversion signal when the measurement of the nearest edge interval is completed.

4. A motor drive controller comprising:
a motor drive circuit that drives a selected motor and having a position detector that detects a position of a rotor of the selected motor and outputs a position detection signal;
a motor control circuit that generates a rotation pulse signal based on the position detection signal; and
a microcomputer that is provided with at least one timer and is configured to:
  generate a conversion signal, which is an expected rotation pulse signal for an expected motor, by multiplying a frequency of the rotation pulse signal by n; and
  output the conversion signal to an external system, where n is a natural number equal to or greater than two,
wherein the microcomputer does not output the conversion signal when a rotation speed of the selected motor is slower than a predetermined speed and outputs the conversion signal when the rotation speed of the selected motor is equal to or faster than the predetermined speed,
wherein the external system controls an operation of the selected motor in place of the expected motor by using the conversion signal,
wherein the microcomputer measures an edge interval of the rotation pulse signal using the timer and determines a time to toggle the conversion signal,
wherein the microcomputer obtains a value by dividing the nearest edge interval measured by the timer by n, sets the timer to the value, and toggles the conversion signal when the timer times out, and
wherein when the conversion signal is toggled (n−1) times, the microcomputer measures a period to a next edge of the rotation pulse signal using the timer to measure the nearest edge interval.

5. A control method of motor drive controller comprising:
driving a selected motor;
detecting a position of a rotor of the selected motor to output a position detection signal;
generating a rotation pulse signal based on the position detection signal;
generating a conversion signal, which is an expected rotation pulse signal for an expected motor, by multiplying a frequency of the rotation pulse signal by n, where n is a natural number equal to or greater than two;
determining a rotation speed of the motor based on the position detection signal;
omitting to output the conversion signal when the rotation speed is slower than a predetermined speed;
outputting the conversion signal to an external system when the rotation speed is equal to or faster than the predetermined speed;
controlling, via the external system, an operation of the selected motor in place of the expected motor by using the conversion signal;
measuring an edge interval of the rotation pulse signal using the timer and determining a time to toggle the conversion signal;
obtaining a value by dividing the nearest edge interval measured by the timer by n, setting the timer to the value, and toggling the conversion signal when the timer times out; and
measuring, after toggling the conversion signal is toggled (n−1) times, a period to a next edge of the rotation pulse signal using the timer to measure the nearest edge interval.

6. The control method of motor drive controller according to claim 5, further comprising:
toggling the conversion signal when the measuring of the nearest edge interval is completed.

* * * * *